US008561048B2

(12) United States Patent
Seeger et al.

(10) Patent No.: US 8,561,048 B2
(45) Date of Patent: Oct. 15, 2013

(54) LATE AND DYNAMIC BINDING OF PATTERN COMPONENTS

(75) Inventors: Frank Seeger, Wiesloch (DE); Frank Stienhans, Mannheim (DE); Jens Ittel, Limburgerhof (DE)

(73) Assignee: SAP AG, Walldorf (DE)

( * ) Notice: Subject to any disclaimer, the term of this patent is extended or adjusted under 35 U.S.C. 154(b) by 1660 days.

(21) Appl. No.: 11/324,136

(22) Filed: Dec. 29, 2005

(65) Prior Publication Data

US 2007/0157191 A1 Jul. 5, 2007

(51) Int. Cl.
*G06F 9/44* (2006.01)

(52) U.S. Cl.
USPC ............ 717/168; 717/109; 717/162; 719/331

(58) Field of Classification Search
USPC ......................................................... 717/111
See application file for complete search history.

(56) References Cited

U.S. PATENT DOCUMENTS

| | | | | |
|---|---|---|---|---|
| 7,448,028 | B2 * | 11/2008 | Koutyrine et al. | 717/148 |
| 7,464,366 | B2 * | 12/2008 | Shukla et al. | 717/100 |
| 7,581,204 | B2 * | 8/2009 | Reeder et al. | 717/105 |
| 7,600,215 | B2 * | 10/2009 | Cherdron et al. | 717/105 |
| 7,614,036 | B2 * | 11/2009 | Bjornson et al. | 717/105 |
| 7,634,756 | B2 * | 12/2009 | Bjornson et al. | 717/107 |
| 7,734,560 | B2 * | 6/2010 | Seeger et al. | 706/48 |
| 8,156,469 | B2 * | 4/2012 | Seeger et al. | 717/107 |
| 2004/0056908 | A1 * | 3/2004 | Bjornson et al. | 345/968 |
| 2004/0148586 | A1 * | 7/2004 | Gilboa | 717/108 |
| 2005/0160398 | A1 * | 7/2005 | Bjornson et al. | 717/104 |
| 2006/0004845 | A1 * | 1/2006 | Kristiansen et al. | 707/103 R |
| 2006/0168577 | A1 * | 7/2006 | Melo et al. | 717/168 |
| 2007/0055978 | A1 * | 3/2007 | Meijer et al. | 719/331 |
| 2007/0073567 | A1 * | 3/2007 | Challapalli | 705/8 |

OTHER PUBLICATIONS

Coulson, G., et al., "A Component Model for Building Systems Software," Proceedings of IASTED Software Enginineering and Applications, 2004 [retrieved Jun. 13, 2013], Retrieved From Internet: <http://comp.eprints.lancs.ac.uk/1721/1/SEA04.pdf>, pp. 1-6.*

* cited by examiner

*Primary Examiner* — Don Wong
*Assistant Examiner* — Todd Aguilera
(74) *Attorney, Agent, or Firm* — Mintz Levin Cohn Ferris Glovsky and Popeo, P.C.

(57) ABSTRACT

A computer-implemented method, system, and computer program product for enabling hot deployment of changes to an implementation of an application. An application pattern is generated. The application pattern includes one or more pattern modules, each pattern module comprising a model, a design time application component to provide content for the model, a runtime application component to execute the model with the content, and a plurality of interfaces that define dependencies between the design time component and runtime component of a first pattern module and respective design time component and runtime component of a second pattern module. The implementation of the application is bound to the plurality of interfaces, such that changes made to the application pattern are added to the implementation of the application.

18 Claims, 7 Drawing Sheets

LATE AND DYNAMIC BINDING OF PATTERN COMPONENTS

BACKGROUND

This document relates to data processing by digital computer in a visual modeling language environment, and more particularly to generating a pattern-based application in a visual modeling environment.

Application programs, sometimes referred to simply as applications, are programs that an end-user runs to accomplish certain tasks. Applications typically work in conjunction with one or more back-end systems, which store the data to be worked on (e.g., business objects and other business data), as well as logic for manipulating the data (e.g., transactions or other business logic). Examples of back-end systems include database systems, enterprise resource planning (ERP) systems, and customer relationship management (CRM) systems. A user interface (UI) is designed to work in concert with application programs, and facilitates interaction between humans and computers by inviting and responding to user input.

Traditional techniques for creating applications involved extensive programming using a specific and complex programming language, which could only be done by an expert of such programming language. New, visual modeling tools such as the Visual Composer tool by SAP AG of Walldorf Germany simplify the creation and management of applications by providing graphical patterns that can connected together to automatically generate code represented by the graphical patterns.

However, even visual modeling tools make it difficult to manage, modify, and propagate modifications to applications that are created and run on multiple client systems. For example, in current implementations, since application development is centralized, it is difficult to adapt a running system to support new requirements.

SUMMARY

This document discloses a computer-implemented method, system and computer program product for hot deployment of pattern-based applications and components thereof.

According to one aspect, a system for enabling hot deployment of changes to an implementation of an application includes an application pattern having one or more pattern modules. Each pattern module includes a model, a design time application component to provide content for the model, a runtime application component to execute the model with the content, and a plurality of interfaces that define dependencies between the design time component and runtime component of a first pattern module and respective design time component and runtime component of a second pattern module.

The system further includes a binder configured to bind the implementation of the application to the plurality of interfaces, such that changes made to the application pattern are added to the implementation of the application. For instance, A is using an interface X. B, C and D are implementing the interface. B, C, D can be bound to a usage of interface X in A. Accordingly, a new component E implementing X built after A can be bound to the usage of X in A without modifying A.

According to another aspect, a computer-implemented method for enabling hot deployment of changes to an implementation of an application is described. The method includes generating an application pattern including a set of interfaces that define dependencies between parts of the application pattern, described above. The method further includes binding the plurality of interfaces to the implementation of the application, such that changes made to the application pattern are added to the implementation of the application. See above: the implementations are binding to usages of interfaces, In accordance with yet another aspect, a computer program product, tangibly embodied in an information carrier, the computer program product being operable to cause a data processing apparatus to execute the method summarized above to enable hot deployment of changes to an implementation of an application, based on a binding of loose coupling interfaces within an application pattern.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
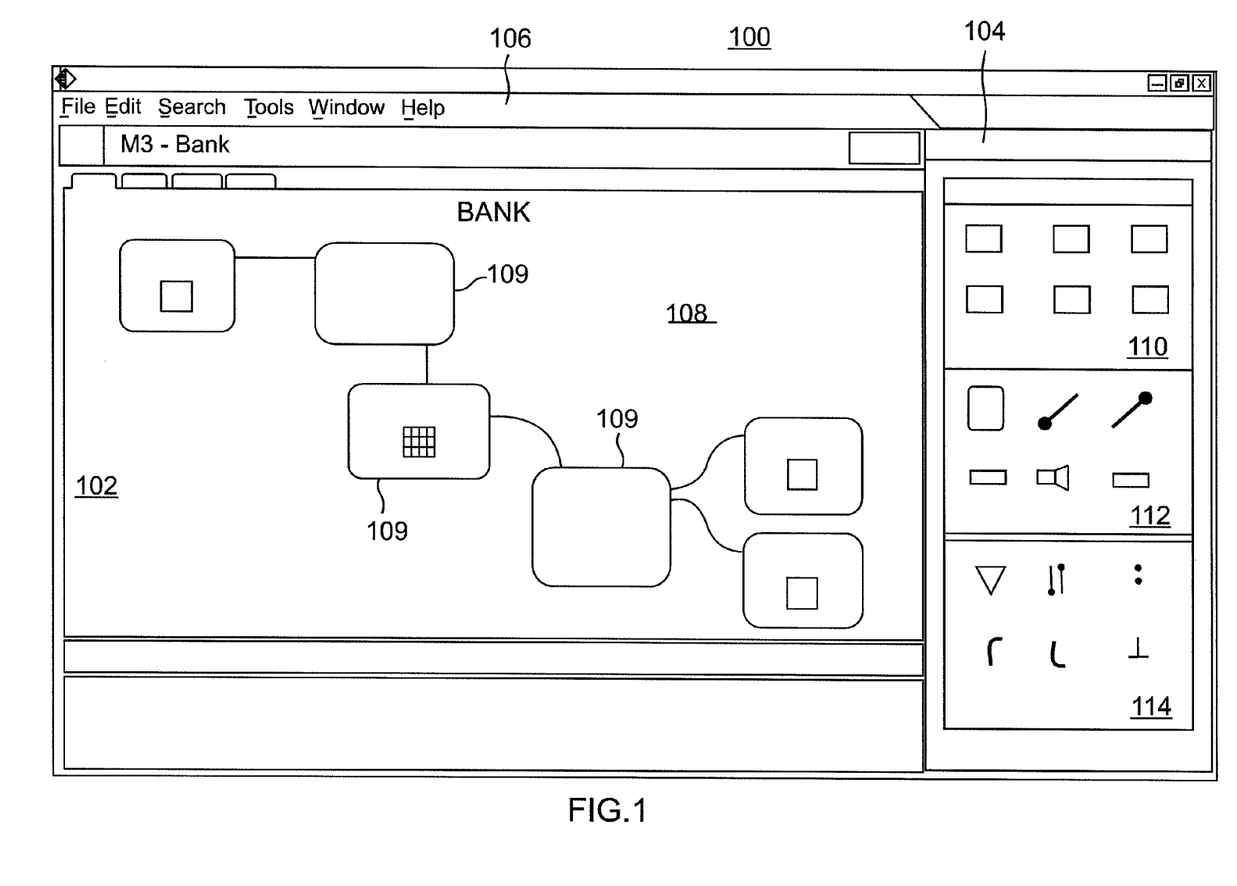
FIG. 1 is a screen shot of a visual modeling tool according to an embodiment.

FIG. 1 is a screen shot of a visual modeling tool 100 for code-free creation of composite applications. The visual modeling tool 100 is platform-independent, as well as independent of any technology or programming language. The visual modeling tool 100 is preferably a web-based, rich-client presentation layer application in a client/server computer architecture. The visual modeling tool 100 includes a visual representation window 102, also known as a "storyboard," a palette 104 of selectable logic elements, and at least one control interface 106 such as a control or command bar. The visual representation window 102 displays a graphical representation of an application 108, or portion thereof. The content of this palette is based on the pattern modules that are applicable in the current context of the story board. This content is enhanced by hot deployment new pattern modules while the designtool is still running.

The application 108 includes application logic and process flows as represented by a number of application objects 109. Each application object 109 can represent a functional step in a logical process or a data flow, and include one or more inputs and one or more outputs. Each application object 109 acts as a model for the execution, testing, simulation, debugging and document creation related to the application 108. A view of the visual modeling tool 100 can be configured to show only a high-level functional view of the application 108 and hide the details, however the view can be adjusted, particularly within each application object 109, so that increasing levels of detail (to the code level) can be viewed in the visual representation window 102. The application objects are those in the composition palette and provide a representation of a pattern module applicable in the current storyboard context.

The selectable logic elements displayed in the palette 104 can include interactors 110 that modify the view of the visual representation window 102, flow control objects 112 that provide a directive of data flow, and data operators 114 that define an operation to be executed on data within each application object 106. The selectable logic elements can be "dragged" from the palette and "dropped" into the visual representation window 102. The visual modeling tool 100 can also include property editors, design assistants, drawing tools, an interaction manager, and a code generator that generates code based on the high-level functional view of the application 108.

The application 108 can be formed, or composed, by establishing relationships 104 between the application objects 109, and to generate a graphical representation of the application 108. The visual modeling tool 100 provides modifiability (composition, decomposition, and recomposition) of an application 108 through visual programming. The graphical representation of the application 108 leads to automatic code generation. Once modeled in the storyboard, an application 108 can be run everywhere irrespective of platform or programming language. Variations can be made to a modeled application 108, while usability and portability is preserved. Changes to the model can be recomputed by the visual modeling tool 100, and propagated to as many versions of an application 108 as desired. In an exemplary embodiment, a composed application is associated with a unique uniform resource locator (URL) that can be accessed by any client computer using any browser, for runtime execution of the application 108.

The model is platform independent. The mapping to a particular platform is defined by the run time part of the pattern modules. A basic difference between a monolithic approach and the modularized approach is that the monolithic approach has a monolithic run time which defines the power of the overall system. The modularized approach has the advantage that the system is open at any point in time for enhancements, i.e. if a certain functionality is not covered by the existing set of pattern modules, a new pattern module can be built providing the required functionality, and using external and late binding the new pattern module can be deployed into the running system without modifying the existing pattern modules. Providing new functionality to a monolithic system will force a change of existing parts of the system.

Figure 2:
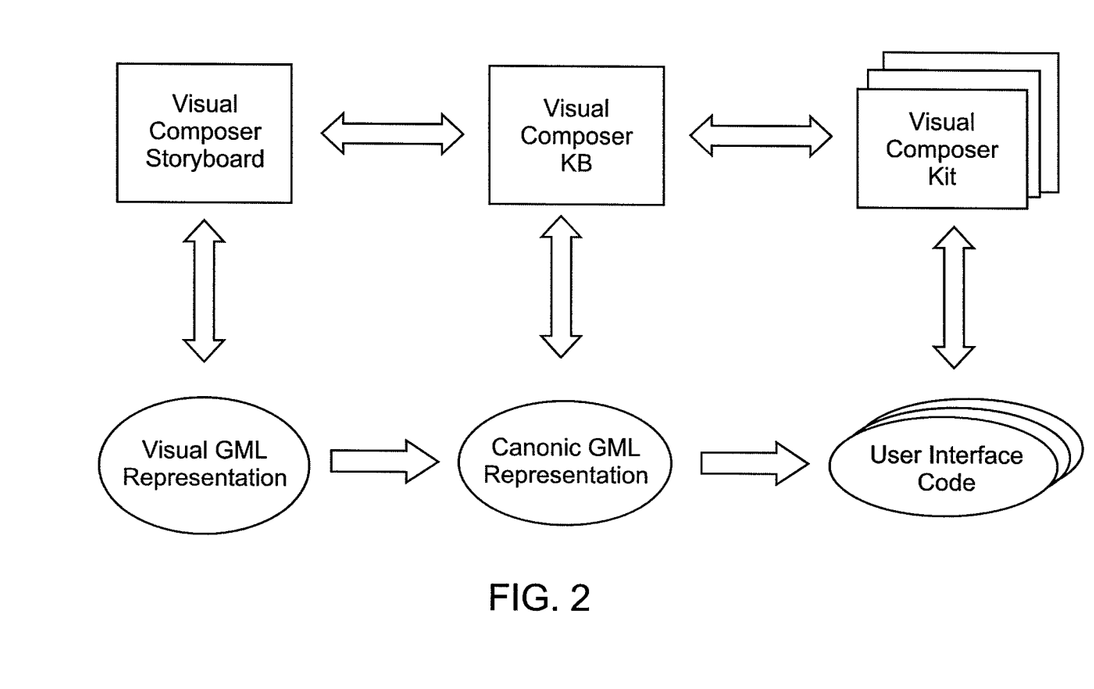
FIG. 2 illustrates the operation of a storyboard of a visual modeling tool that is used to draw and compose model diagrams.
Figure 3:
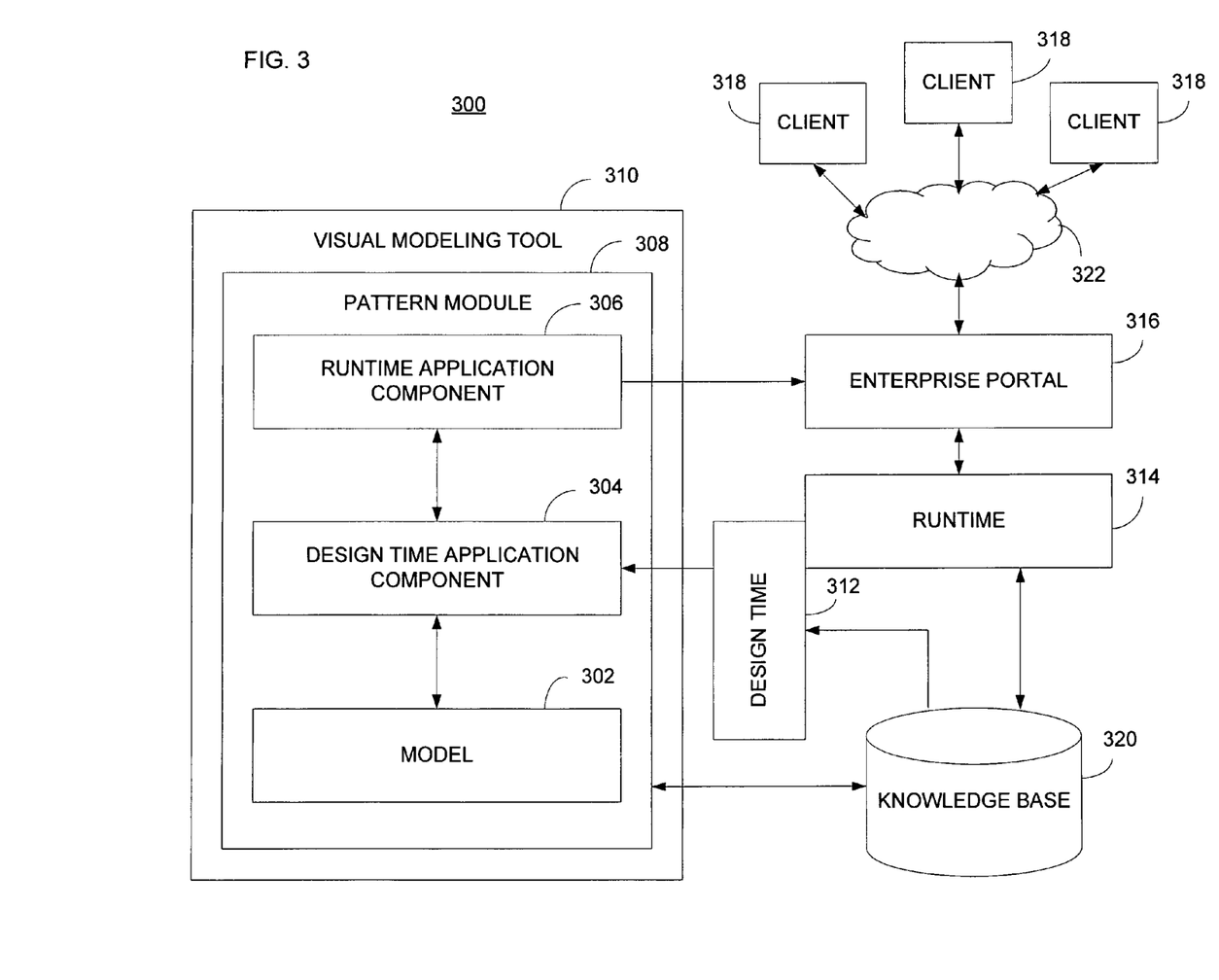
FIG. 3 illustrates a model-driven architecture of an application generation system.

In an exemplary embodiment, the visual modeling tool 100 is similar to the Visual Composer Modeling System developed by SAP AG of Walldorf Germany, as part of their Netweaver platform for business intelligence and analytics. The visual modeling tool 100 can utilize a visual modeling language, such as the GUI Machine Modeling Language (GML) to implement the storyboard. As illustrated in FIG. 2, the storyboard is used to draw and compose model diagrams using a simple and intuitive visual notation, and user interactions such as "drag and drop" operations of application objects. The model is stored in a knowledge base using a machine-readable modeling language, and a number of pre-built graphical modeling kits enable automatic code generation without any programming by a developer. The run time part of a pattern module is running as a interpreter, i.e. it does not require a code generation step. This could be changed by replacing the runtime part by a generator. This is similar to interpreters and compilers working on the same programming language. The language is the model, the interpreter (written for a platform) executes the model by interpretation, the compiler is executing it by mapping/compiling it to a platform FIG. 3 illustrates a model-driven architecture of an application generation system 300, in which models 302 are used by a virtual modeling tool 310 to generate code and as a baseline configuration for future modifications. In some embodiments of a model-driven architecture, an application consists a model 302, a design time application component 304 to provide content for the model, and a runtime application component 306 to execute the model 302 with the content provided by the design time component 304.

The model 302 represents the basic functional and operational data flow and layout of an application, i.e. an application pattern that can be centrally defined and delivered to an enterprise for customization. The design time application component 304 includes data content, user interface logic of the application specified by the model 302. The design time application component 304 uses data content from a knowledge base data repository 320 (e.g. database, infocube, etc.) accessed through a design time application and connectivity module 312. The runtime application component 306 runs the logic of the application specified in the design time application component 304. The runtime application component 306 executes the application and data content from the knowledge base 320 through a runtime application and connectivity module 314. The design time application and connectivity module 312 and runtime application and connectivity module 314 can run in a server arrangement.

The model 302, design time application component 304 and runtime application component 306 can be linked together to form a pattern module 308. The pattern module 308 contains executable parts (runtime and design time) which can be only executed in a certain environment. The pattern module contains a description of this environment. The description describes where the parts of the pattern module can plug in and what can plug in into this module. Accordingly, if changes need to be made to the model 302, each component of the pattern module 308 need not be decomposed, rather the changes are propagated throughout the design time application component 304 and the runtime application component 306 as well.

The openness is not available on the level of a particular pattern module, but on the composition of pattern modules. An application part covered by a single pattern module is defined by configuring the pattern module. This configuration is done using the design time part of the module, stored in the model part and executed by the runtime part of the module. The pattern module 308 can also be exported via an enterprise portal 316 and delivered to client systems 318 via a communications network 322, such as the Internet, to include a wireless communication network, broadband communication network, or other interactive communication medium.

Figure 6:
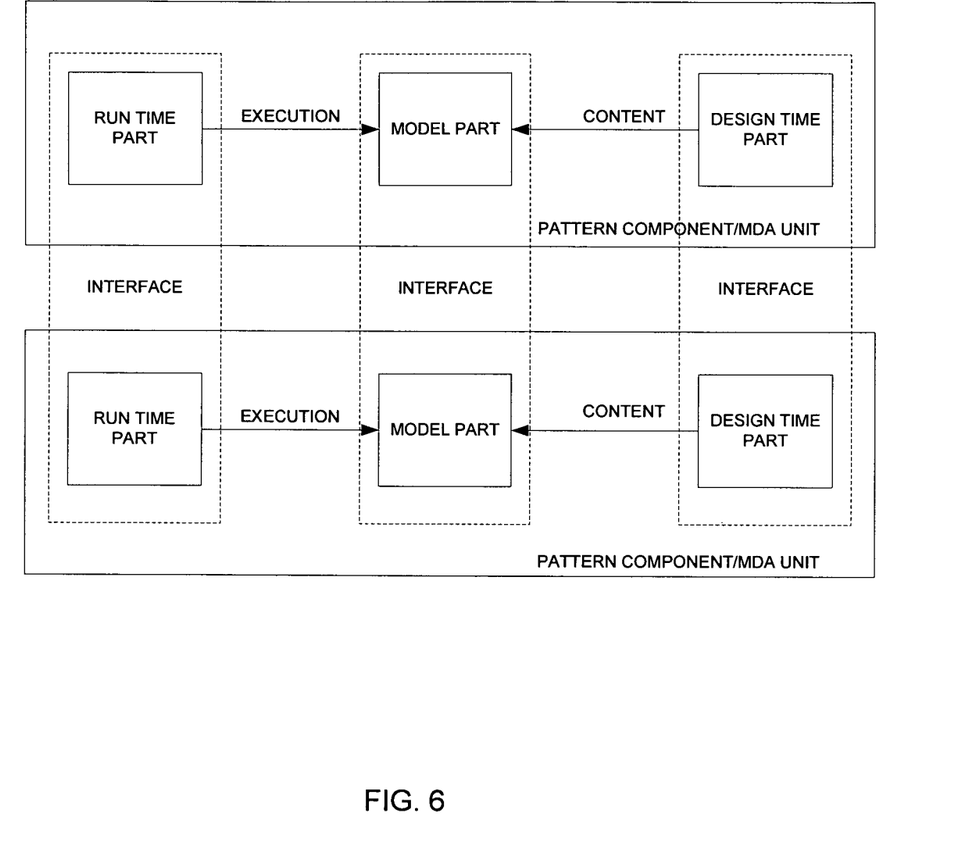
FIG. 6 illustrates a pattern module.

An advantage of the late binding and hot deployment capabilities could be that a remote repository is providing the pattern modules and their meta data. A design time environment such as a visual modeling tool can access this repository. By composing an application step-by-step, the pattern modules are loaded from the repository and the design time part of the module plugs into the visual modeling tool environment connecting to other already-running design time parts via interfaces, as shown in FIG. 6. The resulting model can be deployed to a different system running a runtime environment such as Web Dynpro, which has access to the pattern module repository. The runtime environment loads the runtime parts of the composed application on demand and executes it. The on demand loading of both, the design time and runtime parts requires late and dynamic binding.

Figure 4:
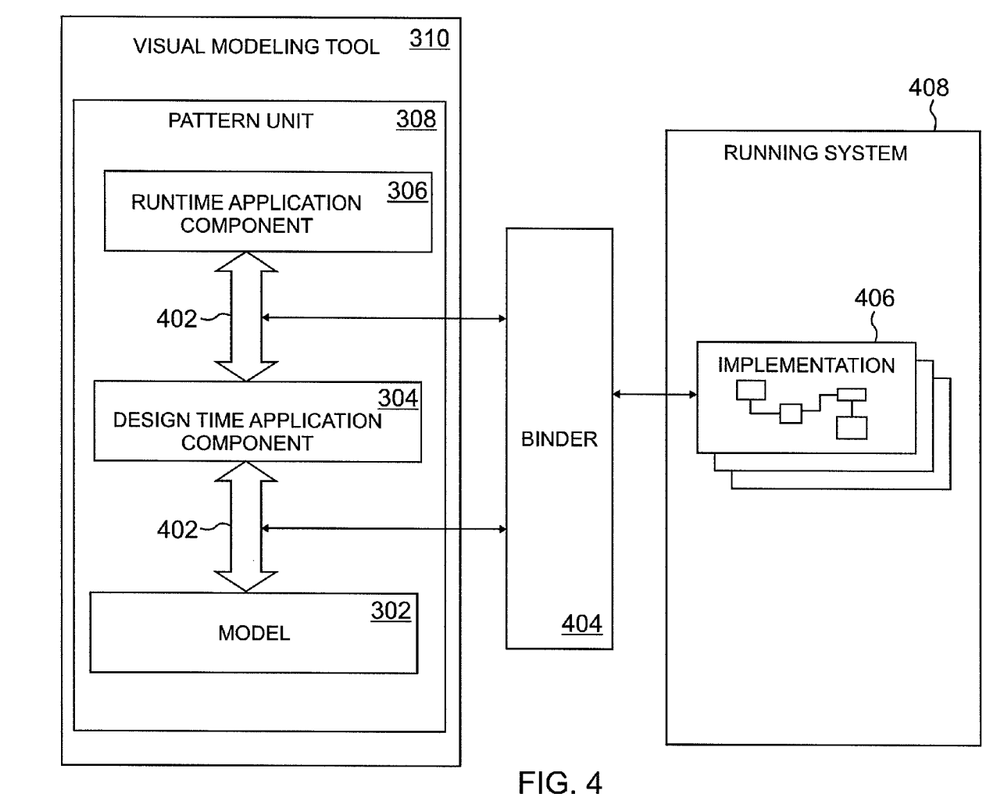
FIG. 4 illustrates interfaces of a pattern module and binding of the interfaces to an implementation of an application.

As illustrated in further detail in FIG. 4, the parts (model 302, design time application component 304, and runtime application component 306) of a pattern module 308 are loosely coupled, i.e. using an abstract definition of dependencies between parts, by interfaces 402. The interfaces 402 are bound to an implementation of an application 406 in an application running system 408 by a binder 404. The binder 404 can be externalized, i.e. implemented in javacode, and used to map the interfaces 402 of a pattern module 308 to the implementation of the application 406 on demand. Accordingly, new pattern components can be "hot deployed" or added to running systems 408, i.e. the implementation of the application can be changed without the need to change a running session. Thus, model development can be decentralized so that the design time environment is adaptive.

A binder is needed for each part type of a module, i.e. one for the runtime parts, one for the model parts, and one for the design time parts. If all parts run on the same platform e.g. Java, J2EE, .NET the same binder can be used for different part types. The physical binding of design time parts, run time parts etc. define in a canonical way a virtual binding on the level of modules.

Figure 5:
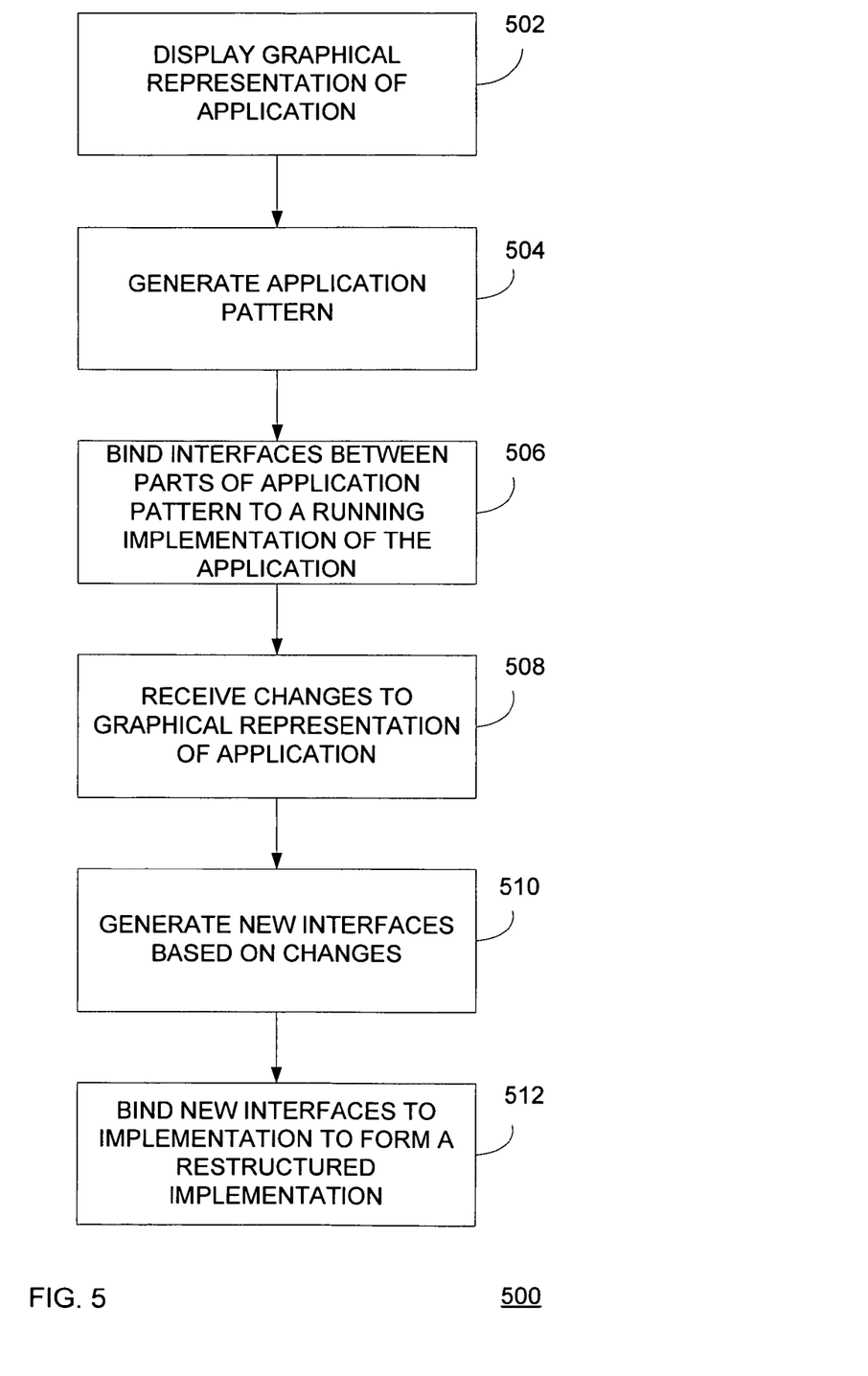
FIG. 5 is a flowchart of a method for enabling hot deployment of changes to an application pattern.

FIG. 5 is a flowchart of a method 500 for enabling hot deployment of changes to an implementation of an application. At 502, displaying a graphical representation of the application pattern is displayed, preferably in a visual modeling tool as described above. At 504, an application pattern is generated. The application pattern includes one or more pattern modules. Each pattern module includes a model, a design time application component to provide content for the model, a runtime application component to execute the model with the content, and a number of interfaces that define dependencies between the model, the design time application component and the runtime application component. The interfaces specify abstract relationships between the parts of the pattern module, based on a current application pattern.

At 506, the plurality of interfaces are bound to the implementation of the application, such that changes made to the application pattern are added to the implementation of the application. In further detail, at 508, the changes are received from a user to the graphical representation of the application pattern. The changes can be a "drag and drop" of an application pattern object into the graphical representation of the application pattern, or by any other mechanism described above. At 510, a new set of interfaces is generated based on the changes. At 512, the new set of interfaces are bound to the implementation of the application to form a restructured implementation of the application.

Figure 7:
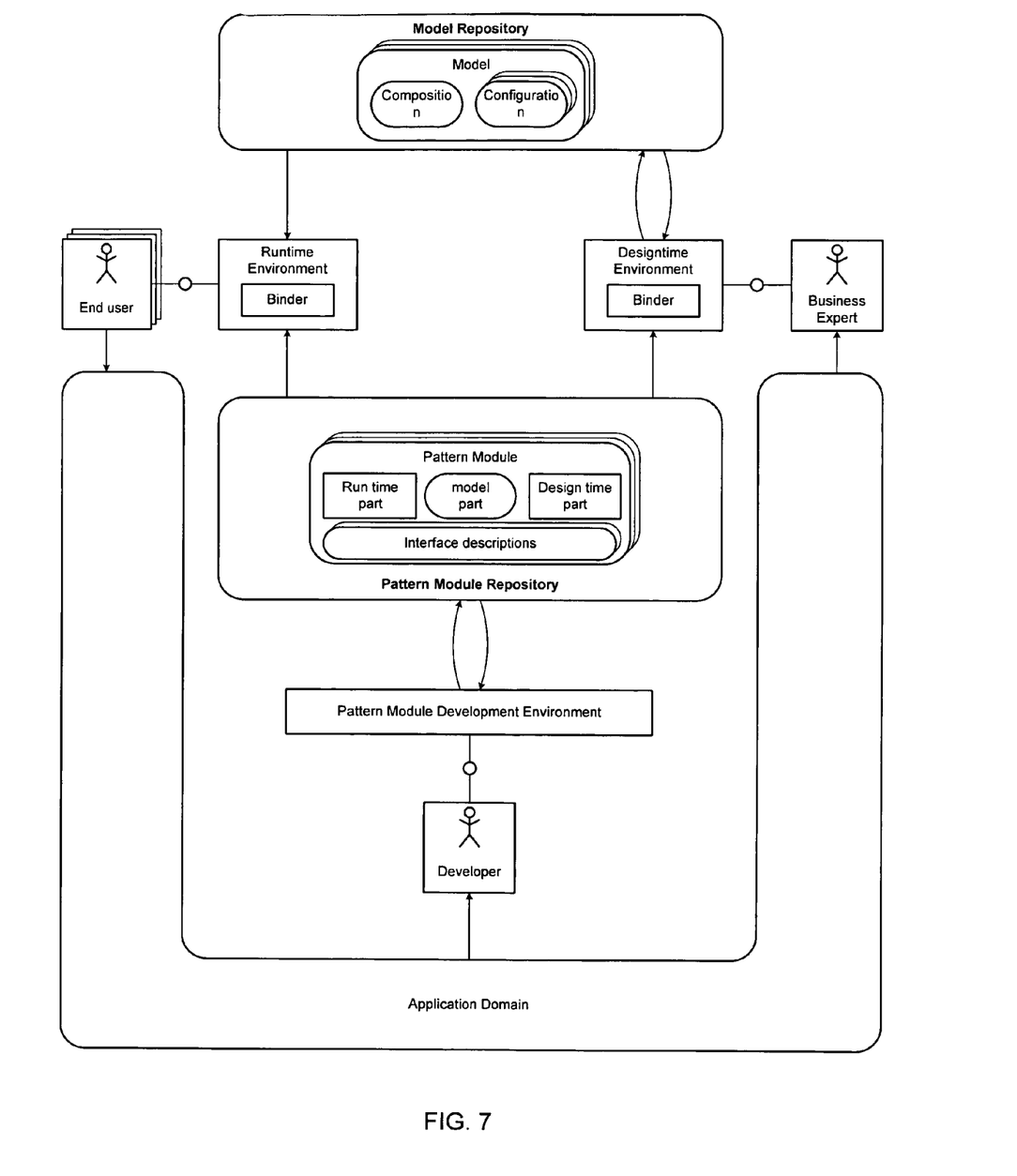
FIG. 7 illustrates a development environment for a visual modeling tool.

With reference to FIG. 7, a development system includes three different roles: the end user(s) running the applications, the business expert modeling the applications, and a developer providing pattern modules developed or modified for specific requirements. The requirements are created by the end users and are taken into account by the business experts and developers. The application domain and the requirements do not exist on a physical basis.

The development system has two repositories, a pattern module repository for storing the pattern modules and their meta descriptions, and a model repository for storing the models that are created by the business expert. The end user executes the models. A model as created by the business expert has two different types of content: a composition and a set of configurations. The composition is basically a graph where each node refers to a configuration and to a pattern module.

A pattern module contains three parts: a design time part which is an executable entity in a certain design time environment, a runtime part which is an executable entity in a certain runtime environment, and a model which is the metamodel of a configuration of a composition node pointing to this pattern module. Additionally, a pattern module contains a set of interface descriptions, defining how the parts of different modules can be combined/composed. The composition capabilities on parts defined by their interfaces define, in a canonical manner, composition capabilities of pattern modules. Two pattern modules can be combined if, and only if, their parts can be combined according to their interfaces.

A business expert composing an application is running a visual modeling tool such as Visual Composer can plug in design time parts from pattern modules located in the pattern module repository. The design time parts actually used are defined by the composition created by the business expert. A particular design time part enables the business expert to configure/model a particular part of an application. A new application parts can be created by composition. The design time environment uses the meta information of the pattern module to determine which other modules can be attached to the current pattern module. If a certain application part supported by a particular pattern module is selected, the environment loads the design time part of the pattern module in order to support configuration of this application part.

When the end user executes such a model, the runtime environment first loads the composition and, for any part of the application that is actually in use, loads the runtime part of the pattern module referred to in the composition. The runtime part that has been loaded for a node in the composition graph will execute the configuration attached to the node in the composition which refers to the pattern module from which the runtime was loaded.

This mechanism is based on "single composition" i.e. the same composition is used to compose the model content, which is the composition of all configurations. The composition is used to compose the model (or meta model of the content) by composing the model parts of the pattern modules referred to by each composition node. Accordingly, the composition is used to compose the total design time by composing the design time parts, etc.

Since the parts of the pattern modules depend on the interfaces they use and implement, new pattern modules can be added to the overall system without modifying existing ones. If certain requirements of an application cannot be realized with a given set of pattern modules, new pattern modules can be developed and deployed to the pattern module repository. This allows modifying the application domain while still providing a restrictive model based on the modules chosen in an actual composition.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to knowledge base architectures that include a relational database; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A system for enabling hot deployment of changes to an implementation of an application, the system comprising:
    a computer having one or more processors; and
    an information carrier providing instructions that, when executed by the one or more processors, cause the one or more processors to perform operations comprising:
    generating an application pattern comprising one or more pattern modules, each pattern module comprising:
        a model from a visual modeling tool representing the basic functional and operational data flow and layout of the application, the model being independent of a platform implementing the application, a design time application component to provide data content and logic for the model, the data content comprising data from a knowledgebase data repository accessed through a design time application and connectivity module, a runtime application component to execute through a runtime application and connectivity module the logic and data content from the knowledgebase specified in the design time application component, the runtime application component defining a mapping to the platform implementing the application, a plurality of interfaces that define dependencies between the design time component and runtime component of a first pattern module and respective design time component and runtime component of a second pattern module, and a plurality of binders that bind the plurality of interfaces of the pattern module to the implementation of the application, the plurality of binders comprising a first binder that binds the model to the implementation of the application, a second binder that binds the design time application component to the implementation of the application, and a third binder that binds the runtime application component to the implementation of the application, the first binder, the second binder, and the third binder differing from each other;

binding the implementation of the application to the plurality of interfaces using the plurality of binders, such that changes made to the application pattern are added to the implementation of the application;

generating, based on received changes to the application pattern, a new plurality of interfaces; and binding the implementation of the application to the new plurality of interfaces to form a restructured implementation of the application without modifying the design time application component or the runtime application component associated with the one or more pattern modules, such that the implementation of the application is changed without the need to stop the application from running.

2. A system in accordance with claim 1, further comprising generating the application pattern using a visual modeling tool.

3. A system in accordance with claim 1, further comprising a data repository coupled with the one or more processors to store the application pattern.

4. A system in accordance with claim 1, further comprising an enterprise portal to distribute the application pattern to one or more client systems.

5. A system in accordance with claim 4, wherein each client system includes an application running system for running the implementation of the application.

6. A system in accordance with claim 1, further comprising:
  a server that stores the application pattern; and
  one or more client systems connected to the server via a communications network and adapted to run the implementation of the application.

7. A system in accordance with claim 6, wherein the server further includes a visual modeling tool to create the application pattern.

8. A system in accordance with claim 7, wherein the visual modeling tool includes a storyboard to provide a graphical representation of the application pattern.

9. A system in accordance with claim 6, wherein the server further includes an enterprise portal that provides the application pattern to the one or more client systems.

10. A system in accordance with claim 6, further comprising a data repository connected with the server, to store the application pattern.

11. A computer-implemented method for enabling hot deployment of changes to an implementation of an application, the method comprising:
  generating an application pattern comprising one or more pattern modules, each pattern module comprising:
    a model from a visual modeling tool representing the basic functional and operational data flow and layout of the application, the model being independent of a platform implementing the application,
    a design time application component to provide data content and logic for the model, the data content comprising data from a knowledgebase data repository accessed through a design time application and connectivity module,
    a runtime application component to execute through a runtime application and connectivity module the logic and data content from the knowledgebase specified in the design time application component, the runtime application component defining a mapping to the platform implementing the application,
    a plurality of interfaces that define dependencies between the design time component and runtime component of a first pattern module and respective design time component and runtime component of a second pattern module, and
    a plurality of binders that bind the plurality of interfaces of the pattern module to the implementation of the application, the plurality of binders comprising a first binder that binds the model to the implementation of the application, a second binder that binds the design time application component to the implementation of the application, and a third binder that binds the runtime application component to the implementation of the application, the first binder, the second binder, and the third binder differing from each other;
  binding the implementation of the application to the plurality of interfaces using the plurality of binders, such that changes made to the application pattern are added to the implementation of the application;
  generating, based on received changes to the application pattern, a new plurality of interfaces; and
  binding the implementation of the application to the new plurality of interfaces to form a restructured implementation of the application without modifying the design time application component or the runtime application component associated with the one or more pattern modules, such that the implementation of the application is changed without the need to stop the application from running.

12. A method in accordance with claim 11, wherein generating the application pattern includes displaying a graphical representation of the application pattern.

13. A method in accordance with claim 12, further comprising receiving the changes from a user to the graphical representation of the application pattern.

14. A method in accordance with claim 11, wherein the forming of the restructured implementation is performed by adding a new pattern module.

15. A method in accordance with claim 14, wherein the design time application component uses meta information of the one or more pattern modules to determine the new pattern module.

16. A computer program product comprising a non-transitory computer-readable storage medium storing instructions that, when executed, cause a data processing apparatus to:

generate, using one or more processors of the data processing apparatus, an application pattern comprising one or more pattern modules, each pattern module comprising:

a model from a visual modeling tool representing the basic functional and operational data flow and layout of the application, the model being independent of a platform implementing the application, a design time application component to provide data content and logic for the model, the data content comprising data from a knowledgebase data repository accessed through a design time application and connectivity module, a runtime application component to execute through a runtime application and connectivity module the logic and data content from the knowledgebase specified in the design time application component, the runtime application component defining a mapping to the platform implementing the application, a plurality of interfaces that define dependencies between the design time component and runtime component of a first pattern module and respective design time component and runtime component of a second pattern module, and a plurality of binders that bind the plurality of interfaces of the pattern module to the implementation of the application, the plurality of binders comprising a first binder that binds the model to the implementation of the application, a second binder that binds the design time application component to the implementation of the application, and a third binder that binds the runtime application component to the implementation of the application, the first binder, the second binder, and the third binder differing from each other;

bind the implementation of the application to the plurality of interfaces using the plurality of binders, such that changes made to the application pattern are added to the implementation of the application;

generate, based on received changes to the application pattern, a new plurality of interfaces; and bind the implementation of the application to the new plurality of interfaces to form a restructured implementation of the application without modifying the design time application component or the runtime application component associated with the one or more pattern modules, such that the implementation of the application is changed without the need to stop the application from running.

17. A computer program product in accordance with claim 16, further being operable to cause a data processing apparatus to display, using the one or more processors, a graphical representation of the application pattern.

18. A computer program product in accordance with claim 17, further being operable to cause a data processing apparatus to receive, using the one or more processors, the changes from a user to the graphical representation of the application pattern.

* * * * *